United States Patent
Ng et al.

(10) Patent No.: US 8,614,683 B2
(45) Date of Patent: Dec. 24, 2013

(54) TOUCH SENSITIVE INPUT DEVICE HAVING FIRST AND SECOND DISPLAY LAYERS

(75) Inventors: Brian Ng, Los Angeles, CA (US); Philippe Alessandrini, Palo Alto, CA (US); Brian Finn, East Palo Alto, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/188,085

(22) Filed: Jul. 21, 2011

(65) Prior Publication Data

US 2012/0019463 A1   Jan. 26, 2012

Related U.S. Application Data

(63) Continuation of application No. 11/460,157, filed on Jul. 26, 2006, now abandoned.

(60) Provisional application No. 60/731,302, filed on Oct. 28, 2005.

(51) Int. Cl.
*G06F 3/041* (2006.01)

(52) U.S. Cl.
USPC ............... 345/173; 345/1.1; 345/4; 345/156; 345/108; 345/110

(58) Field of Classification Search
USPC ............ 345/1.1–1.3, 4, 9, 156, 173, 108, 100
See application file for complete search history.

(56) References Cited

U.S. PATENT DOCUMENTS

| | | | |
|---|---|---|---|
| 3,622,224 A | 11/1971 | Wysocki et al. | |
| 4,885,656 A | 12/1989 | Suzuki et al. | |
| 5,757,359 A * | 5/1998 | Morimoto et al. | 345/156 |
| 5,988,902 A | 11/1999 | Holehan | |
| 6,317,114 B1 | 11/2001 | Abali et al. | |
| 6,429,846 B2 | 8/2002 | Rosenberg et al. | |
| 6,661,425 B1 * | 12/2003 | Hiroaki | 345/629 |
| 6,906,762 B1 | 6/2005 | Witehira et al. | |
| 7,053,917 B2 | 5/2006 | Kato et al. | |
| 7,319,436 B2 | 1/2008 | Tomisawa | |
| 2002/0008691 A1 * | 1/2002 | Hanajima et al. | 345/173 |
| 2002/0175901 A1 | 11/2002 | Gettemy | |
| 2004/0021643 A1 * | 2/2004 | Hoshino et al. | 345/173 |
| 2004/0108995 A1 * | 6/2004 | Hoshino et al. | 345/173 |
| 2004/0239582 A1 | 12/2004 | Seymour | |
| 2005/0052341 A1 | 3/2005 | Henriksson | |
| 2005/0219206 A1 | 10/2005 | Schena et al. | |

(Continued)

FOREIGN PATENT DOCUMENTS

| | | |
|---|---|---|
| DE | 20102197 U1 | 6/2001 |
| DE | 20022244 U1 | 11/2001 |

(Continued)

OTHER PUBLICATIONS www.3m.com, 1 page, 2006.

*Primary Examiner* — Gregory J Tryder
(74) *Attorney, Agent, or Firm* — King & Spalding L.L.P.

(57) ABSTRACT

An input device, especially for a vehicle, includes a first display for optical display of information, at least a second display arranged above the first display for optical display of information and a touchscreen arranged above the second display for entry of commands by touching an operating surface of the touchscreen.

19 Claims, 3 Drawing Sheets

(56) References Cited

U.S. PATENT DOCUMENTS

| | | |
|---|---|---|
| 2005/0259087 A1* | 11/2005 | Hoshino et al. .............. 345/173 |
| 2006/0132455 A1* | 6/2006 | Rimas-Ribikauskas et al. ............................ 345/173 |
| 2006/0132456 A1* | 6/2006 | Anson ........................... 345/173 |
| 2006/0132457 A1* | 6/2006 | Rimas-Ribikauskas et al. ............................ 345/173 |
| 2007/0080951 A1 | 4/2007 | Maruyama et al. |

FOREIGN PATENT DOCUMENTS

| | | |
|---|---|---|
| DE | 20180024 U1 | 11/2001 |
| EP | 0920704 B1 | 10/2004 |
| EP | 1560102 A2 | 8/2005 |
| WO | 97/21160 A2 | 6/1997 |
| WO | 99/26230 A1 | 5/1999 |
| WO | 01/54109 A1 | 7/2001 |
| WO | 03/038800 A1 | 5/2003 |

\* cited by examiner

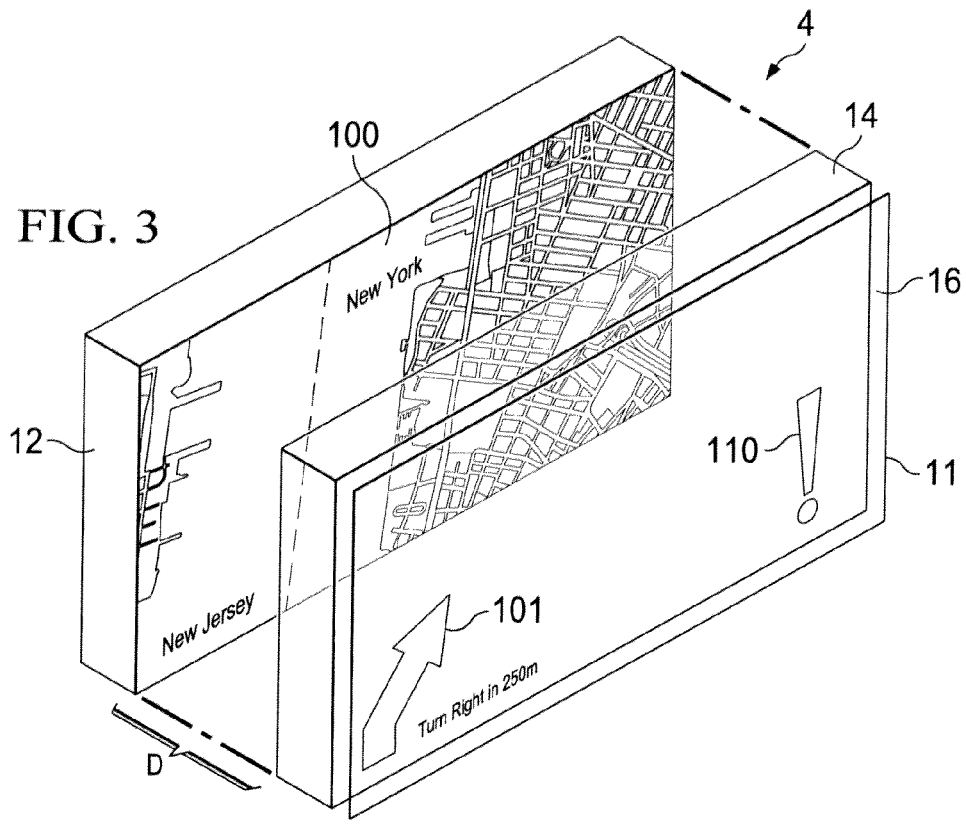
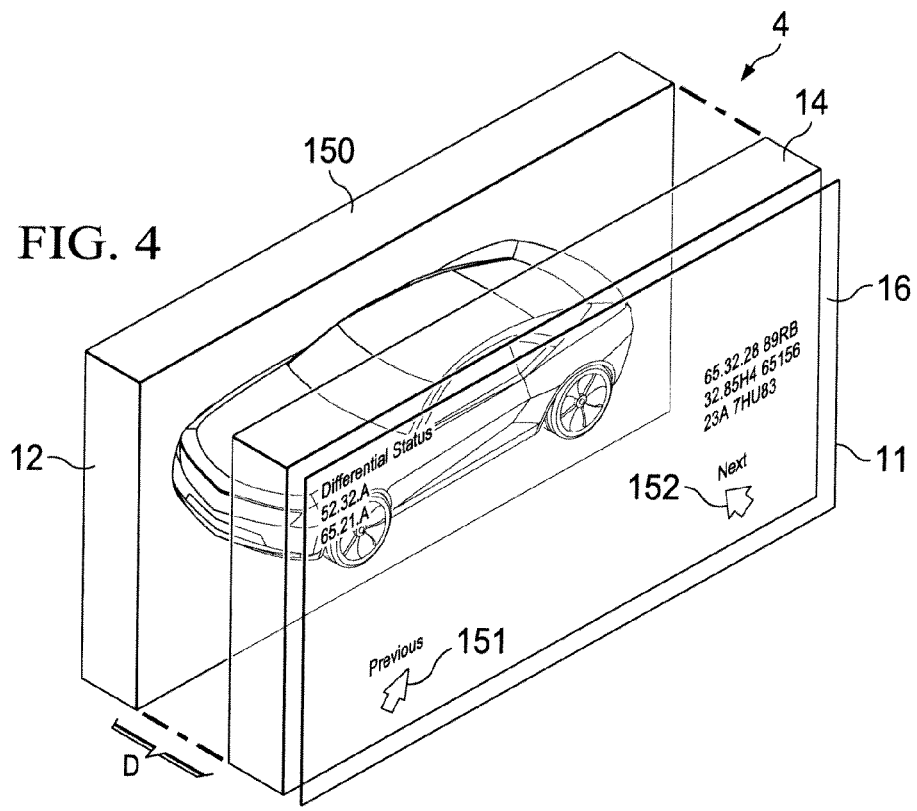

TOUCH SENSITIVE INPUT DEVICE HAVING FIRST AND SECOND DISPLAY LAYERS

CROSS-REFERENCE TO RELATED APPLICATIONS

This application is a continuation of U.S. application Ser. No. 11/460,157 filed Jul. 26, 2006, now abandoned which claims the benefit of U.S. Provisional Application No. 60/731,302 filed on Oct. 28, 2005. The contents of which are hereby incorporated by reference in their entirety.

TECHNICAL FIELD

The invention concerns an input device, especially for a vehicle, with a touchscreen.

BACKGROUND

A touchscreen is known, for example, from DE 201 02 197 U1 (incorporated by reference). A touchscreen for display of electronic signals and a confirming touch input of characters and symbols, consisting of a functional level for display and key input and a higher order, point-deformable protective level corresponding to it, is disclosed in DE 201 02 197 U1. A confirmation signal for the sense of touch (haptic stimulation) of the user, detectable at the position of the contact point in the deformed protective level, is generated during selection of certain points of the functional level by touching the protective level, and the confirmation signal for the sense of touch (haptic stimulation) is generated by oscillation elements eccentrically arranged within and/or beneath the functional level. In addition, transmission of the generated oscillations from the functional level to the protective level occurs in the touchscreen known from DE 201 02 197 U1 by direct contact of the two levels and/or via the edge regions of these levels by rigid or elastic connection elements.

Touchscreens are also known from U.S. Pat. No. 4,885,565 and EP 920 704 B1. Appropriate touchscreens can be obtained, for example, from 3M™ (see www.3M.com). Additional details concerning touchscreens can be taken from EP 1 560 102 A1.

A touch control with haptic feedback for input of signals into a computer and for output of forces to a user of the touch control is known from DE 201 80 024 U1 and the corresponding WO 01/54109A1 (incorporated by reference) for haptic feedback, in which the touch control has a touch input device that has a roughly flat contact surface, operated so that a position signal is entered into a processor of the computer based on a position on the contact surface that a user touches, in which the position signal indicates the position in two dimensions. The touch control according to WO 01/54109 A1 also has at least one actuator connected to the touch input device, in which the actuator sends a force to the touch input device, in order to provide a haptic sensation to the user touching the contact surface, in which the actuator sends the force directly to the touch input device based on force information issued by the processor.

Haptic feedback is also known from U.S. Pat. No. 6,429,846, WO 03/038800 A1, U.S. Pat. No. 5,988,902, WO 922/26230 A1, WO 97/21160 A1, DE 200 22 244 U1 and WO 03/41046 A1.

SUMMARY

The task of the invention is to improve an input device with a touchscreen. It is desirable to create an input device, particularly suited for vehicles.

The aforementioned task is solved by an input device, especially for a vehicle, in which the input device includes a first display for optical display of information, at least a second display arranged above the first display for optical display of information and a touchscreen arranged above the second display for input of commands by touching the operating surface of the touchscreen.

The touchscreen according to the invention is especially a transparent touchscreen. The display according to the invention is especially a display or matrix display for variable display of information. A first display according to the invention can be a TFT, for example.

In another embodiment of the invention, the operating surface is provided on a side of the touchscreen facing away from the second display.

In another embodiment of the invention, the touchscreen is connected to the second display.

In another embodiment of the invention, a spacing between the first display and second display is variable.

In another embodiment of the invention, the second display is transparent, at least in a significant area.

In another embodiment of the invention, the input device includes a control to drive the second display, so that, by means of the second display, an operating element and/or a warning message can be displayed. In another embodiment of the invention, by means of the first display, an explanation of the operating element and/or a context of the operating element can be displayed.

In another embodiment of the invention, the input device includes an actuator to move the touchscreen in at least one direction. In another embodiment of the invention, the second display can be moved by means of the actuator. In another embodiment of the invention, the touchscreen is connected to the second display. In another embodiment of the invention, a spacing between the first display and the second display is variable. In another embodiment of the invention, the second display is transparent, at least in a large area.

In another embodiment of the invention, the input device includes a control to drive the actuator, so that the touchscreen can be moved to confirm touching of an operating surface of the touchscreen. In another embodiment, it is prescribed that the operating element can be displayed by means of the second display. In another embodiment, an explanation of the operating element and/or a context of the operating element can be displayed by means of the first display.

The aforementioned task is also solved by a method for operating of an input device (especially comprising one or more of the aforementioned features) with a first display for optical display of information, with at least a second display arranged in the first display for optical display of information, and with a touchscreen arranged above the second display for input of commands by touching an operating surface of the touchscreen, in which an operating element and/or a warning message is displayed by means of the second display.

In one embodiment of the invention, an explanation of the operating element and/or a context of the operating element is displayed by means of the first display.

In another embodiment of the invention, the touchscreen is moved to confirm touching of the operating surface of the touchscreen.

Vehicle according to the invention is especially an individual land vehicle, usable in traffic. Vehicles according to the invention are not particularly restricted to land vehicles with internal combustion engines.

Touching of the touchscreen can also or only be pressing on the touchscreen, according to the invention.

Operating elements, displayed by means of the display, according to the invention can be buttons, pushbuttons, slides, knobs, etc. It can be prescribed that information displayed on the display, like information in the narrow sense, an operating element, a warning, etc., can be "moved" from one display to a next display. It can then be prescribed that this is connected to a haptic confirmation by moving of the touchscreen.

It can be prescribed that at least two different displays are assigned different haptic feedbacks. These haptic feedbacks then differ, in particular, in that they are distinguishable for an average user.

It can be prescribed that a graphic element is movable during light touching of the touchscreen and executable during strong touching of the touchscreen. Both functions can be assigned different haptic feedbacks.

It can be prescribed that inactive operating element are displayed on the (rear) first display and active operating elements on the (front) second display. If an inactive operating element becomes active, i.e., the entered function is operable, corresponding operating elements are displayed by means of a second display.

It can also be prescribed to use one of the displays, especially the second display, to display alternative input functions, like speech recognition or gesture recognition.

Another invention or embodiment concerns a navigation system with an input device (especially comprising one or more of the aforementioned features), in which the input device includes a first display for optical display of information, at least a second display arranged above the first display for optical display of information and a touchscreen arranged above the second display for input of commands by touching an operating surface of the touchscreen, and in which the input device includes a control to drive the first and second display, so that, by means of the first display, a map can be displayed and, by means of the second display, direction information and/or an operating element can be displayed.

Another invention or embodiment concerns a method for operation of a navigation system with an input device (especially comprising one or more of the aforementioned features), in which the input device includes a first display for optical display of information, at least a second display arranged above the first display for optical display of information and a touchscreen arranged above the second display for entry of commands by touching an operating surface of the touchscreen, and in which a map is displayed, by means of the first display, and direction information and/or an operating element is displayed by means of the second display.

Another invention or embodiment concerns a diagnosis system with an input, device (especially with one or more of the aforementioned features), in which the input device has a first display for optical display of information, at least a second display arranged above the first display for optical display of information and a touchscreen arranged above the second display for input of commands by touching an operating surface of the touchscreen, and in which the input device includes a control for driving the first and second displays, so that diagnosis information can be displayed by means of the first display and direction information and/or an operating, element can be displayed by means of the second display.

Another invention or embodiment concerns a method for operation of a diagnosis system with an input device (especially comprising one or more of the aforementioned features), in which the input device includes a first display for optical display of information, at least a second display arranged above the first display for optical display of information and a touchscreen arranged above the second display for input of commands by touching an operating surface of the touchscreen, and in which diagnosis information is displayed by means of the first display and an operating element is displayed by means of the second display.

Additional features and details are apparent from the following description of the practical examples.

BRIEF DESCRIPTION OF THE DRAWINGS

FIG. 3 shows the input device according to FIG. 2 in a perspective side view;

FIG. 4 shows the input device according to FIG. 2 in a perspective side view.

DETAILED DESCRIPTION

Figure 1:
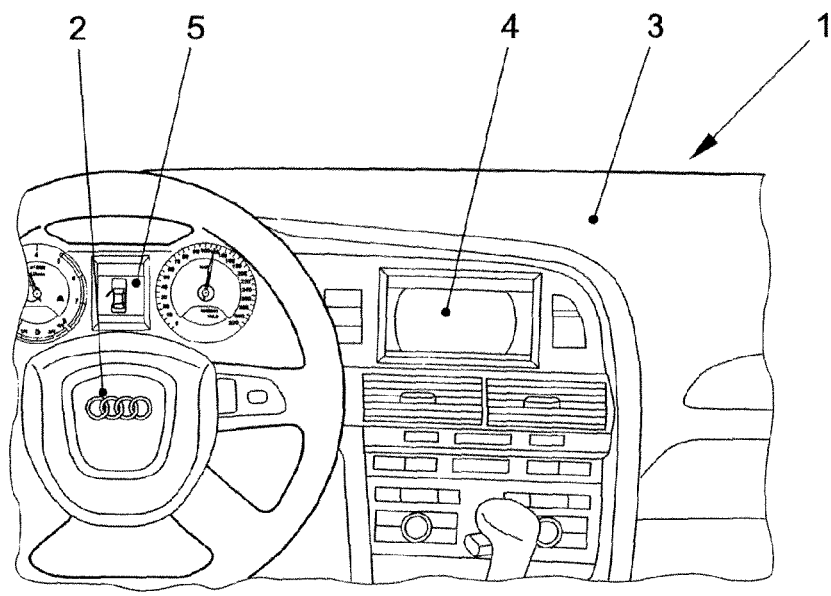
FIG. 1 shows a practical example of a vehicle in an interior view.

FIG. 1 shows a practical example of a vehicle 1 in an interior view. In vehicle 1, a steering wheel 2 is arranged beneath the dashboard 3. The dashboard 3 has an input device 4 arranged next to steering wheel 2. As an alternative or in addition, an input device corresponding to input device 4 can also be arranged in steering wheel 2. As an alternative, a display according to the input device 4, designated with reference number 5, can also be equipped.

Figure 2:
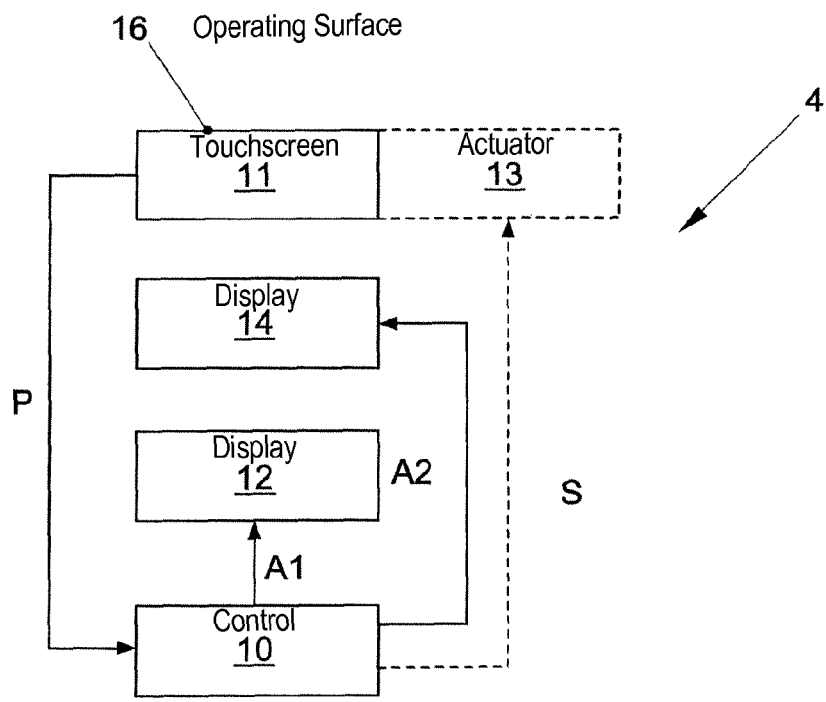
FIG. 2 shows a practical example of an input device in a sketch.

FIG. 2 shows the input device 4 in a sketch. FIG. 3 and FIG. 4 show the input device 4 in a reduced perspective side view. The input device 4 includes a display 12 for optical display of information, at least an additional, essentially transparent display 14 arranged above display 12 for optical display of information and a touchscreen 11 arranged above display 14 for input of commands by touching an operating surface 16 of touchscreen 11. Additional, essentially transparent displays can be arranged between display 12 and display 14. In an optional embodiment, the input device 4 includes an actuator 13 to move touchscreen 11 in at least one direction. One embodiment of actuator 13 can be taken, for example, from EP 1 560 102 A1. In addition, piezo actuators or so-called voice coils can be used as actuator 13. It can be prescribed that the distance D between display 12 and display 14 is variable.

The input device 4 also includes a control 12, by means of which different information can be displayed by output of the corresponding display signals A1 and A2 on displays 12 and 14. In addition, the control 10 enters the position signal P sent by the touchscreen 11, which states, the position of touching of the operating surface 16 or pressing on the operating surface. In addition, the control 10, if provided, controls movement of actuators 13 by output of the control signal S. It can be prescribed that at least two different pressure stages are distinguishable by means of touchscreen 11. In this case, the position signal P also includes the extent of the pressure exerted on touchscreen 11.

The displays 12 and 14 and touchscreen 11 can be arranged in a housing. In an alternative embodiment of the input device 4, the display 12 is arranged in a housing (not shown), which can be moved relative to display 12 by means of actuator 13. Outside on the housing, the display 14 is arranged above display 12 and touchscreen 11 above display 14. The housing is transparent in the region of display 14. It can also be prescribed that display 14 is part of the housing.

In another embodiment, the input device 4 includes the display 12, the display 14 arranged above display 12, the touchscreen 11 arranged above display 14, as well as a flexible element arranged between display 12 and display 14 (for a case, in which the touchscreen 11 is connected to display 14 and is movable relative to display 12) or between the display 14 and the touchscreen 11 (for the case, in which the touchscreen 11 is movable relative to display 14) (not shown) to prevent penetration of particles between display 12 and display 14 (for a case, in which the touchscreen 11 is connected to display 14 and movable relative to display 12) or between display 14 and touchscreen 22 (for a case, in which the touchscreen 11 is movable relative to display 14). The flexible element is then advantageously arranged on the edge of the touchscreen, so that it does not cover a display surface of display 12 or 14. In an advantageous embodiment, the flexible element has a rigidity that is adjusted to the weight of the touchscreen 11 and display 14 or a weight of the touchscreen 11, so that touchscreen 11, in conjunction with the flexible element, has a mechanical natural frequency between 5 Hz and 150 Hz in the movement direction. The natural frequency is then adjusted especially to actuator 13 or actuator 13 is chosen according to the natural frequency. The flexible element can consist of a foamed material, like polyurethane, or an elastomer. The flexible element can be configured according to U.S. Pat. No. 4,044,186 or the corresponding DE 2 349 499.

For the case, in which touchscreen 11 is connected to display 14 and movable relative to display 12, it can be prescribed that the information displayed by means of display 14 is shifted oppositely, so that it does not appear moved for a user.

In the state shown in FIG. 3, the input device 4 serves as a man-machine interface for a navigation system. For this purpose, a map 100 is displayed by means of display 12 and a direction information 101 and warning 110 by means of display 14. Traffic characters and/or operating elements can also be displayed by means of display 14. It can also be prescribed that a selection window for selection of an enlarged map section can be displayed by display 14. Warnings can be connected to an acoustic signal.

In the state depicted in FIG. 4, the input device 4 serves as a man-machine interface for a diagnosis system. For this purpose, diagnosis information 150 is displayed by display 12 and operating elements 151, 152 by display 14. By touching touchscreen 11 in the region of operating elements 151, 152, the diagnosis information 150 displayed by display 12 can be changed. By moving the touchscreen 11, a haptic confirmation of successful operation of one of the operating elements 151, 152 can occur. Different operating elements 151, 152 can be assigned different haptic effects. In particular, operating elements with a warning function can be assigned a special haptic effect. It can also be prescribed that details of the diagnosis information 150 are displayed by means of display 14. It can also be prescribed that this can be pushed into the foreground by an operator from display 12 from the background of display 14.

Figure 5:
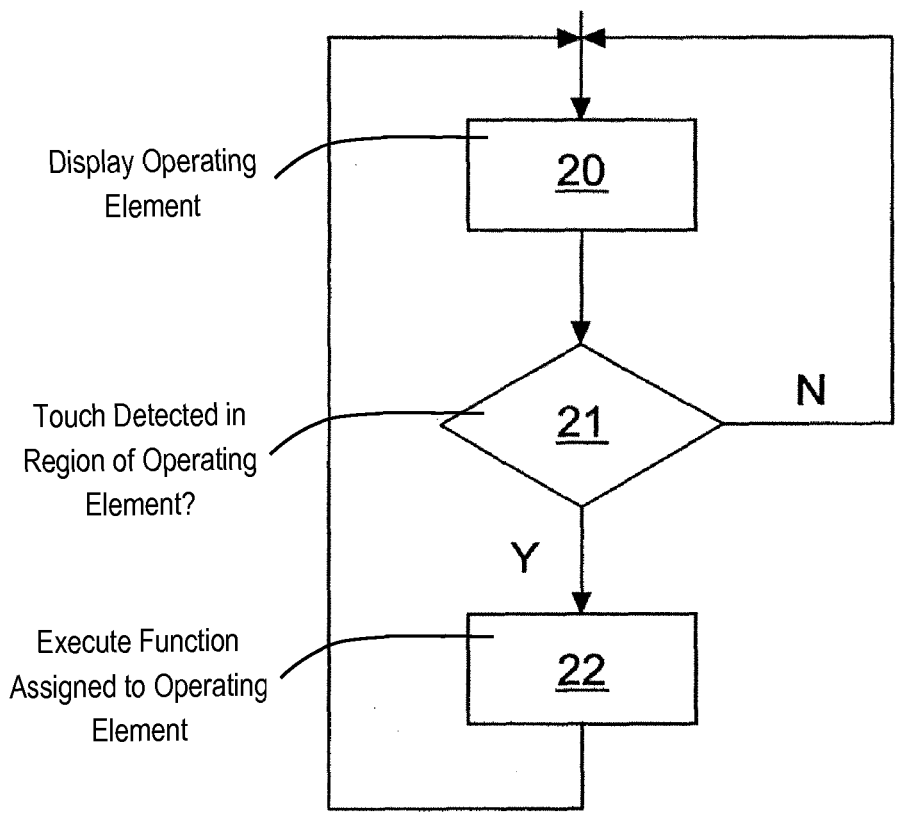
FIG. 5 shows a method for operation of the input device according to FIG. 2.

FIG. 5 shows an example of a method for operation of the input device 4. An operating element is displayed in a step 20 by means of display 14 and an explanation of the operating element and/or a context of the operating element is displayed by means of display 12. Step 20 is followed by a query 21 whether the operating surface 1.6 of the touchscreen 11 is touched in the region of this operating element. If the operating surface 16 of the touchscreen 11 is not touched in the region of this operating element, step 20 follows query 21. If the operating surface 16 of touchscreen 11, on the other hand, is touched in the region of this operating element, query 21 is followed by step 22, in which a function assigned to the operating element is executed. Step 22 is followed by step 20, in which, under some circumstances of operation of the operating element, corresponding different information is displayed.

Although described in conjunction with a vehicle as a particularly appropriate application for the invention, the invention is not to be restricted for this application.

LIST OF REFERENCE NUMBERS

1 Vehicle
2 Steering wheel
3 Dashboard
4 Input device
5 Display
10 Control
11 Touchscreen
12, 14 Display
13 Actuator
16 Operating surface
20, 22 Step
21 Query
100 Map
101 Direction information
110 Warning
150 Diagnosis information
151, 152 Operating element
A1, A2 Display signal
D Distance
P Position signal
S Control signal

What is claimed is:

1. An input device for a vehicle, comprising:
a first physical display device for optical display of information;
a transparent second physical display device for optical display of information, the transparent second physical display device distinct from the first physical display device and arranged between the first physical display device and a user such that information displayed on the first physical display device is viewable through the transparent second physical display device;
a touchscreen arranged above the transparent second physical display device such that the transparent second physical display device is arranged in line between the first physical display device and the touchscreen, the touchscreen configured for input of commands by touching an operating surface of the touchscreen;
a flexible element disposed around a perimeter of the touchscreen so that the flexible element does not cover a display surface of the second physical display device;
the flexible element forming an assembly with the touchscreen, the first physical display device, and the second physical display device that prevents penetration of particles between the first physical display device and the second physical display device;
the flexible element having a rigidity chosen so that the assembly has a mechanical natural frequency between about 5 Hz and about 150 Hz in the line from the first physical display device through the second physical display device to the user;
a controller configured to:
classify a user touch at a location on the touchscreen as a light touch or a strong touch, the touch location corresponding to an image displayed on one of the first and second physical display devices;
if the user touch is classified as a light touch, move the image displayed on one of the first and second physical display devices to the other one of the first and second physical display devices, but not executing an operation of the vehicle corresponding with the image; and if the user touch is classified as a strong touch, executing an operation of the vehicle corresponding with the image; and an actuator driven by the controller to vibrate the assembly at substantially the mechanical natural frequency of the assembly in response to the user touch at a location on the touchscreen, thereby confirming the touching.

2. The input device according to claim 1, wherein at least one of the first and second physical display devices is operable to display an operating element at said location.

3. The input device according to claim 1, wherein the actuator moves the touchscreen in at least one direction to control the distance between the first physical display device and the second physical display device.

4. The input device according to claim 3, wherein the second physical display device is moveable by means of the actuator.

5. The input device according to claim 3, wherein the controller is configured to control the actuator to generate different haptic feedbacks for a light and a strong touch.

6. The input device according to claim 5, wherein the image represents an operating element and wherein an inactive operating element is displayed on the first physical display device and an active operating element is displayed on the second physical display device.

7. The input device according to claim 5, wherein at least one of the distinct first and second display devices is operable to display an operating element at said location and wherein the controller is configured to control the actuator to generate different haptic feedbacks for different operating elements displayed on said first or second display device when the location of an operating element is touched.

8. The input device according to claim 1, wherein the image represents an operating element and wherein an inactive operating element is displayed on the first physical display device and an active operating element is displayed on the second physical display device.

9. The input device according to claim 1, wherein the touchscreen is configured to detect at least two different pressure levels exerted at the touchscreen.

10. The input device according to claim 9, wherein touchscreen generates a position signal and a pressure signal.

11. A method for operating an input device for a vehicle comprising a first physical display device for optical display of information, a transparent second physical display device for optical display of information, the transparent second physical display device distinct from the first physical display device and arranged between the first physical display device and a user such that information displayed on the first physical display device is viewable through the transparent second physical display device, and a touchscreen arranged above the transparent second physical display device such that the transparent second physical display device is arranged in line between the first physical display device and the touchscreen, the touchscreen configured for input of commands by touching an operating surface of the touchscreen, a flexible element forming an assembly with the touchscreen, the first physical display device, and the second physical display device that prevents penetration of particles between the two physical display elements, and the flexible element having a rigidity chosen so that an assembly has a mechanical natural frequency between about 5 Hz and about 150 Hz in the line from the first physical display device through the second physical display device to the user, the method comprising:

providing haptic feedback by an actuator, thereby verifying a user touch has been sensed by vibrating the assembly substantially at the mechanical natural frequency of the assembly;

classifying a user touch at a location on the touchscreen as a light touch or a strong touch, the touch location corresponding to an image displayed on one of the first physical display device and the transparent second physical display device;

if the user touch is classified as a light touch, moving the image displayed on one of the first physical display device and the transparent second physical display device to the other one of the first physical display device and the transparent second distinct physical display device, but not executing an operation of the vehicle corresponding with the image; and if the user touch is classified as a strong touch, executing an operation of the vehicle corresponding with the image.

12. The method according to claim 11, further comprising displaying an operating element by at least one of the first and second physical display devices at said location.

13. The method according to claim 11, wherein the second physical display device is moveable by means of the actuator.

14. The method according to claim 11, further comprising controlling the actuator to generate different haptic feedbacks for a light and a strong touch.

15. The method according to claim 14, wherein the image represents an operating element and wherein an inactive operating element is displayed on the first physical display device and an active operating element is displayed on the second physical display device.

16. The method according to claim 14, further comprising displaying an operating element at said location and controlling the actuator to generate a haptic feedback when the operating element is touched wherein different haptic feedbacks are generated for different operating elements displayed on said first or second display device.

17. The method according to claim 11, wherein the image represents an operating element and wherein an inactive operating element is displayed on the first physical display device and an active operating element is displayed on the second physical display device.

18. The method according to claim 11, further comprising detecting at least two different pressure levels exerted at the touchscreen by means of the touchscreen.

19. The method according to claim 18, further comprising generating a position signal and a pressure signal by the touchscreen.

\* \* \* \* \*